United States Patent [19]
Ansel et al.

[11] Patent Number: 4,579,431
[45] Date of Patent: Apr. 1, 1986

[54] PLATEN CAPABLE OF MOVING IN A PLANE AND PARTICULARLY ADAPTED FOR USE IN A MICROFICHE READER

[75] Inventors: José Ansel, Neuville-Les-Dieppe; Francois Laumonier, Les Grandes-Ventes, both of France

[73] Assignee: Rhone-Poulenc Systems, Nanterre, France

[21] Appl. No.: 669,304

[22] Filed: Nov. 7, 1984

Related U.S. Application Data

[63] Continuation of Ser. No. 511,756, Jul. 7, 1983, abandoned.

[30] Foreign Application Priority Data

Jul. 9, 1982 [FR] France .................................. 82 12230

[51] Int. Cl.⁴ .......................... G03B 1/52; G03B 23/08
[52] U.S. Cl. .................................................. 353/27 R
[58] Field of Search .................................... 353/25–27, 353/22, 23

[56] References Cited

U.S. PATENT DOCUMENTS 3,446,552 5/1969 Gross et al. ...................... 353/27 R
3,881,369 5/1975 Looney .......................... 353/27 R X

FOREIGN PATENT DOCUMENTS 911651 11/1962 United Kingdom .
1153667 5/1969 United Kingdom .
1396609 6/1975 United Kingdom .
1396879 6/1975 United Kingdom .
1410539 10/1975 United Kingdom .

*Primary Examiner*—Harry N. Haroian
*Attorney, Agent, or Firm*—Burns, Doane, Swecker & Mathis

[57] ABSTRACT

A microfiche reader includes a base, a light source, an optical system and a platen that is capable of moving in a plane. Movement of the platen in two perpendicular, linear directions is controlled by two motors, each of which is fixedly mounted on the base. Connection between the movable platen and the fixed motors is provided by means of three interconnected slides, two of which are disposed parallel to one another.

9 Claims, 7 Drawing Figures

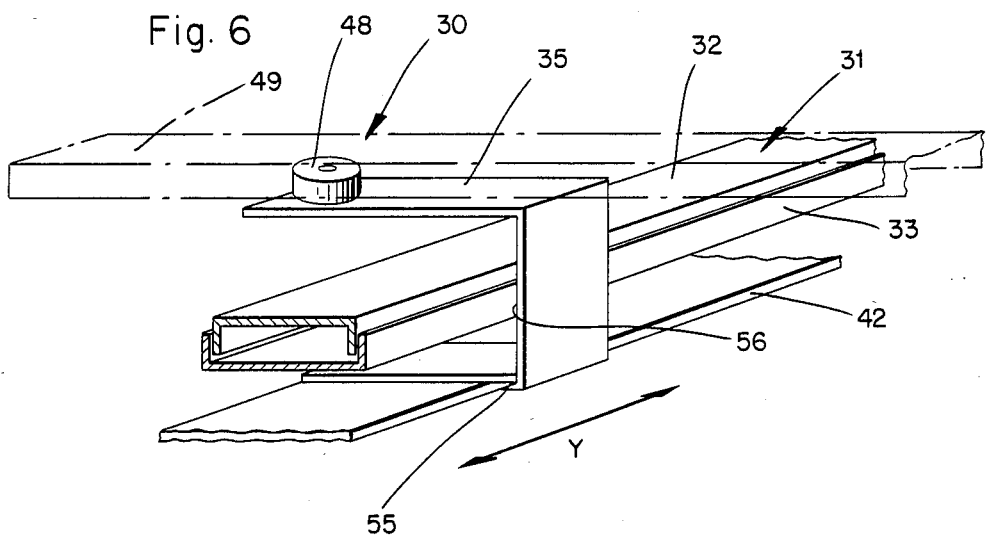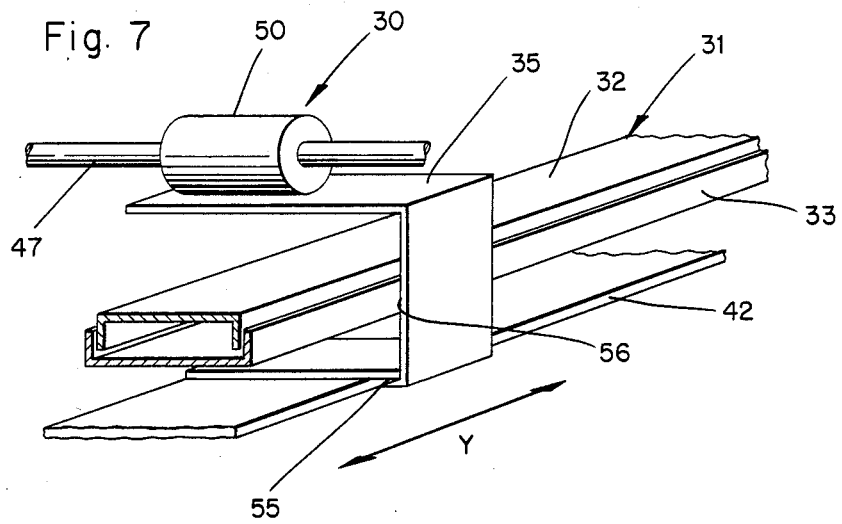

PLATEN CAPABLE OF MOVING IN A PLANE AND PARTICULARLY ADAPTED FOR USE IN A MICROFICHE READER

This application is a continuation of application Ser. No. 511,756 filed July 7, 1983 now abandoned.

BACKGROUND OF THE INVENTION

The present invention relates to an apparatus comprising a platen capable of moving in a plane, this platen being especially intended to carry microfiches. It particularly relates to the means making it possible to bring a specified microview on the platen into position opposite the optical system of the apparatus, without manual intervention by the user.

The invention also relates to the use of such an apparatus as a microfiche reader, and is described hereinafter with more particular reference to a microfiche reader.

In microfiche readers, the microfiches are arranged on the platen of the apparatus between two glass plates. This platen is capable of moving in a plane along an infinity of trajectories resulting from the movement of the platen in two rectilinear intersecting directions, these movements making it possible to place a chosen microview opposite the optical system of the apparatus.

The movements of the platen in each of the two intersecting directions are generally produced by two motors, one of the motors being usually fixed and the other being movable relative to the base and to most of the apparatus. Typically, in a conventional microfiche reader, each arrangement for movement of the platen in each direction comprises a toothed wheel fixed at an end of a shaft of the motor and two rack bars with teeth which intermesh with those of the toothed wheel. One of these rack bars is permanently attached to the platen, while the other, which picks up the play between the teeth of the fixed rack bar and of the toothed wheel, is applied against the teeth of the toothed wheel with the help of at least one spring.

In use, it proves difficult to obtain complete coincidence between the rotation of the motor and the movement transmitted to the rack bar attached to the platen, and it is therefore difficult to control the movement of the platen and consequently the position of the individual microviews.

Furthermore, the fact that one of the motors is movable relative to the whole of the reader implies that the space required for its movement must be provided in the apparatus, which increases the bulk of the apparatus.

Moreover the weight of this motor which is mounted on a movable part of the apparatus requires a reinforcement of this mobile part, resulting in an addition to the weight of the movable part. Besides, the mobility of the motor complicates its electrical supply.

OBJECTS AND BRIEF STATEMENT OF THE INVENTION

The object of the present invention is to provide a novel apparatus comprising a platen which is capable of moving in a plane, and is especially intended to carry microfiches, which avoids these disadvantages.

A more particular object of the invention is to provide a novel apparatus of this kind which makes it possible to bring a specified microview on the platen into position opposite the optical system of the apparatus, accurately and without manual intervention by the user.

The movements of the platen are described hereinafter, for the purpose of clarity, as being discrete movements in translation in two intersecting rectilinear directions. However, it will be appreciated that these movements can be simultaneous and the resulting movement can follow an infinity of planar trajectories.

An apparatus implementing the principles of the present invention comprises at least a light-source, an optical system, a base and a platen especially intended to carry microfiches, with this platen being capable of moving in a plane. The apparatus is characterized in that the movements of the platen are produced by two motors which are fixed relative to the base of the apparatus.

Since the apparatus which is the subject of the invention can, for example, be employed as a reader, including a reader which provides for the reproduction of microfiches, the light-source and the optical system are of a conventional design dependent on the use of the apparatus. Similarly, since the positions of the optical system and of the light-source depend on the use of the apparatus, the description of the inventive concept will be made hereinafter with reference to the base of the apparatus.

The apparatus according to the invention is such that the movements of the platen are produced through the intermediacy of first and second slide means. The first slide means has a part integral with the base of the apparatus and a part connected to the platen through the intermediary of the second slide means. The second slide means comprises a part which is integral with the part of the first slide means that is connected to the platen and a part integral with the platen, the first and second slide means being such that they make possible the movements of the platen in two intersecting directions. The first and second slide means are of a generally rectilinear configuration.

By the term "integral with" is meant that the two parts are assembled in such a manner that they are attached one to another without relative movement, so that the part of the first slide means which is integral with the base of the apparatus can be attached to the base by screwing, soldering or glueing, for instance.

By the term "connected" it is understood that the two "connected" parts are assembled in such a manner that they are movable with respect to one another, so that the part of the first slide means which is connected to the platen of the apparatus is assembled through the intermediary of the second slide means, and the platen is therefore movable relative to the concerned part of the first slide means.

The slides can be provided with the help of devices that are conventionally employed for guiding rectilinear movement. Thus, each slide can be made up of two elongated parts, one part comprising a rib of a prismatic cross-section, for example in the shape of the V or of a dovetail, which cooperates with a groove of corresponding cross-section in the second elongated part. The contacting surfaces of the groove and of the rib are advantageously provided with a coating which facilitates the sliding movement, such as polytetrafluoroethylene.

The slide can also be provided with wheels or with rollers. Advantageously, in the apparatus according to a preferred embodiment of the invention, ball slides are employed.

In the apparatus according to the invention, the two motors which are fixed relative to the base of the apparatus and which produce the movement of the platen are arranged such that a first motor drives the part of the first slide which is connected to the platen and a second motor drives a third slide having a part which is integral with the base of the apparatus. Means of connection between the second and third slides move according to a fixed rectilinear trajectory which is parallel to the second slide, while driving the part of the second slide which is integral with the platen. Thus the third slide has a general arrangement which is rectilinear and parallel to the second slide.

According to an embodiment of the apparatus which is the subject of the invention, the connecting means can consist of a yoke that is integral with the movable part of the third slide, this movable part moving under the effect of the second motor in a direction which is parallel to the second slide, with the yoke driving a rod integral with the platen, which is parallel to the first slide. The rod and the yoke move in a translational movement relative to one another.

An apparatus according to another embodiment can be such that the connecting means can consist of a thrust bearing that is integral with the movable part of the third slide, this movable part moving under the effect of the second motor in a direction which is parallel to the second slide. The thrust bearing is disposed in a groove of the platen which is parallel to the first slide. The thrust bearing and the groove move in a translational movement relative to one another.

According to yet another embodiment of the invention, the connecting means can consist of a bushing that is integral with the movable part of the third slide. The movable part moves under the effect of the second motor in a direction which is parallel to the second slide, the bushing driving a rod integral with the platen and parallel to the first slide. The rod and the bushing move in a translational movement relative to one another.

Preferably, the apparatus according to the invention is provided with a first slide and a second slide which are such that they permit movements of the stage in two perpendicular directions.

The first and second motors can respectively drive the part of the first slide which is connected to the platen and the connecting means through the intermediacy of belts and pulleys or of pinions and chains. Advantageously, the first and the second motor can respectively drive the part of the first slide connected to the platen and the connecting means through the intermediacy of cog belts and toothed wheels.

The first and second motors can be stepper motors or continuously operating motors with alternating direction of rotation. The first and/or second motor can be controlled, for example, automatically by a keyboard device associated with a microcomputer such as the device described in the French Patent Application No. 80/11,540. This device makes it possible to choose the desired microview and to bring it opposite the optical system of the apparatus. The first and second motors can also be controlled automatically by a device connected to a programmer which makes it possible to successively and automatically bring the previously chosen microviews opposite the optical system of the apparatus.

The apparatus which is the subject of the invention is particularly advantageous for use in the reading of microfiches.

An understanding of the invention will be facilitated by the accompanying figures which illustrate, by way of example, diagrammatically and without a specific scale, an embodiment of an apparatus according to the invention and various embodiments of means of connection which are incorporated in such an apparatus.

BRIEF DESCRIPTION OF THE DRAWINGS

FIGS. 6 and 7 are perspective views of two other embodiments of the connecting means.

DESCRIPTION OF PREFERRED EMBODIMENTS

Figure 1:
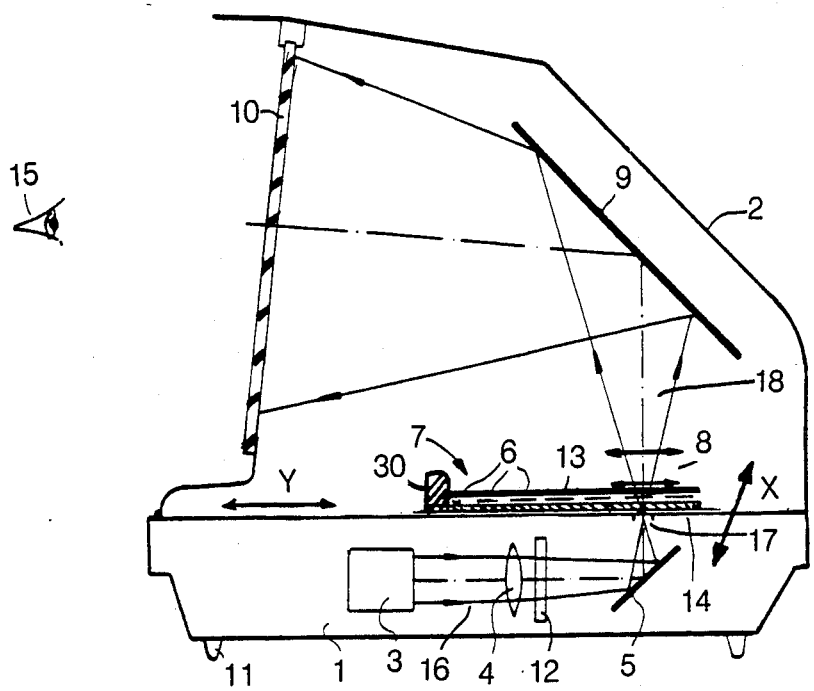
FIG. 1 is a general schematic diagram, in a cross-section perpendicular to the platen of an apparatus which is the subject of the invention.
Figure 2:
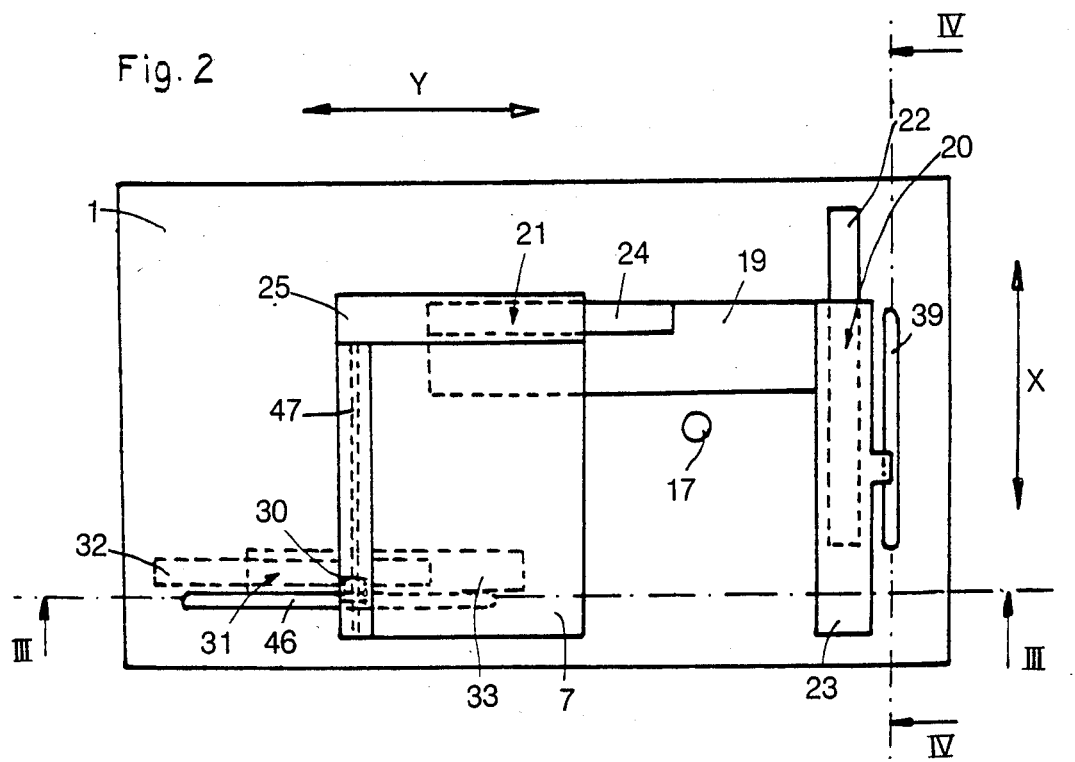
FIG. 2 is a plan view of the base and of the platen.
Figure 3:
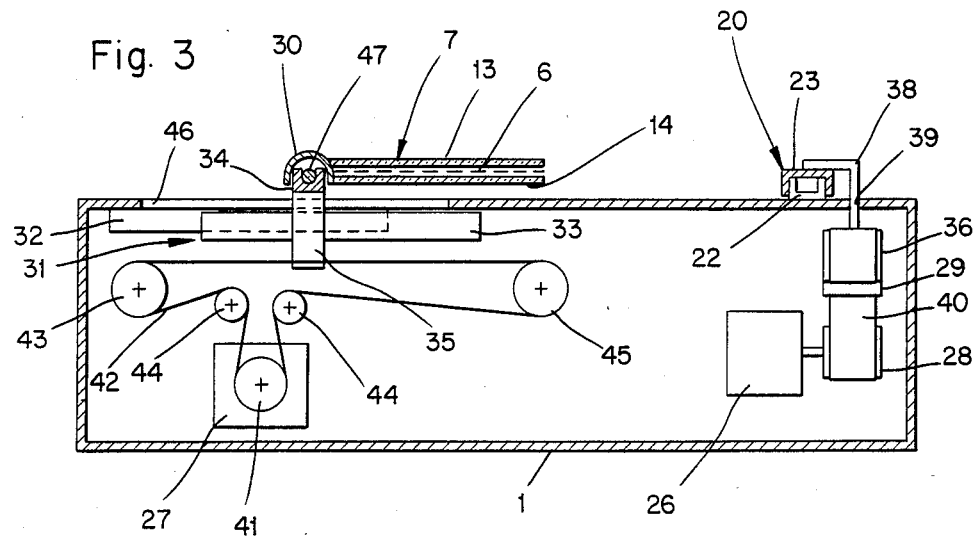
FIG. 3 is a view in cross-section of the base of the apparatus, taken along the line III—III of FIG. 2.
Figure 4:
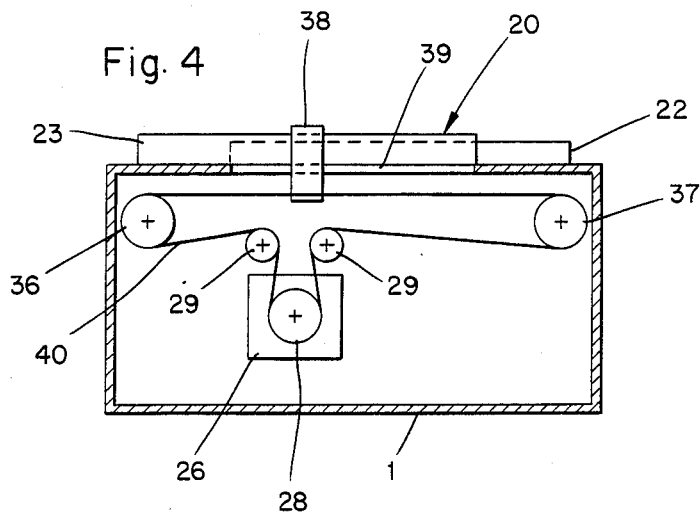
FIG. 4 is a view in cross-section of the base of the apparatus, taken along the line IV—IV of FIG. 2.

An apparatus which is intended for the reading of microfiches is shown in FIG. 1 in section by a plane perpendicular to the platen 7. It comprises a base 1 and a hood 2 which envelops the face of the base 1 in the vicinity of which the platen 7 moves. The other faces of the base 1 can be provided with feet 11.

The apparatus also comprises a light-source 3 and an optical system composed at least of a lens 4, a filter 12, a mirror 5, an objective 8 and a mirror 9. The light-source 3, the lens 4, the filter 12 and the mirror 5 are situated inside the base 1; the objective 8 and the mirror 9 are situated inside the hood 2.

A platen 7 capable of moving in a plane essentially parallel to the face of the base 1 in the vicinity of which the former is placed, in two perpendicular directions X and Y, is composed of two glass plates 13 and 14 between which is arranged a microfiche 6. Of course, the platen 7 also comprises means allowing the microfiche 6 to be slid between the glass plates 13 and 14.

The hood 2 is closed at the user's side 15 by a translucent screen 10, for example of ground glass or filled glass or of plastic.

In operation, the light source 3 emits a light beam 16 which, after passing through the lens 4 and the filter 12, is reflected by the mirror 5 through a hole 17 in the face of the base 1 and impinges upon the micro-fiche 6 which is placed between the glass plates 13 and 14 of the platen 7. The light beam 18 emerging from the microfiche 6 then passes through the objective 8, is reflected by the mirror 9 and forms an enlarged image of the microfiche on the translucent screen 10.

The means permitting the movements of the platen 7 with the help of motors will be described below with particular reference to FIGS. 2, 3, 4 and 5. The movements of the platen 7 of the apparatus according to the invention take place through the intermediacy of a first slide 20 and of a second slide 21. In the illustrated embodiment of the invention, the first slide 20 and the second slide 21 are such that they permit the movements of the platen 7 in two rectilinear perpendicular directions. The first slide 20 permits the movement of the platen 7 in the direction X and the second slide 21 permits the movement of the platen in the direction Y, the direction Y being perpendicular to and in the same plane as the direction X.

The first slide 20 comprises a fixed part 22 that is integral with the base 1 of the apparatus and a movable part 23 connected to the platen 7 through the intermediacy of the second slide 21. The second slide 21 comprises a fixed part 24 that is integral with the movable part 23 of the first slide 20 and a movable part 25 that is integral with the platen 7. The movable part 23 of the first slide 20 is connected to the platen 7, through the intermediacy of the second slide 21, by means of a plate 19. The plate 19 is integral with the movable part 23 of the first slide 20 and with the fixed part 24 of the second slide 21.

The movements of the platen 7 are produced by a first motor 26 and a second motor 27. The first motor 26 drives the movable part 23 of the first slide 20 and the second motor 27 drives a connecting means 30 that is integral with a third slide 31. This third slide has a fixed part 32 that is integral with the base 1 of the apparatus and a movable part 33, and it is this movable part 33 which is driven directly by the second motor 27.

A toothed wheel 28 mounted on the shaft of the first motor 26 transmits movement through the intermediacy of a cog belt 40, toothed wheels 36, 37 and toothed rollers 29 to the movable part 23 of the first slide 20. This movable part 23 can, for example, be integral with the belt 40 with the help of a driving tab 38 fixed by appropriate means to the belt 40 on the one hand and to the movable part 23 of the first slide 20 on the other hand. According to the illustrated embodiment, the driving tab 38 passes through the face of the base 1 through an elongated aperture 39.

A toothed wheel 41 on the shaft of the second motor 27 transmits movement through the intermediacy of a cog belt 42, toothed wheels 43, 44, and toothed rollers 45 to the movable part 33 of the third slide 31. This movable part 33 of the third slide 31 can be integral with the belt 42 by means of a driving tab 35 fixed to the belt 42 at 55 and to the movable part 33 of the third slide 31 at 54. The driving tab 35 passes through the face of the base 1 through an elongated aperture 46.

Figure 5:
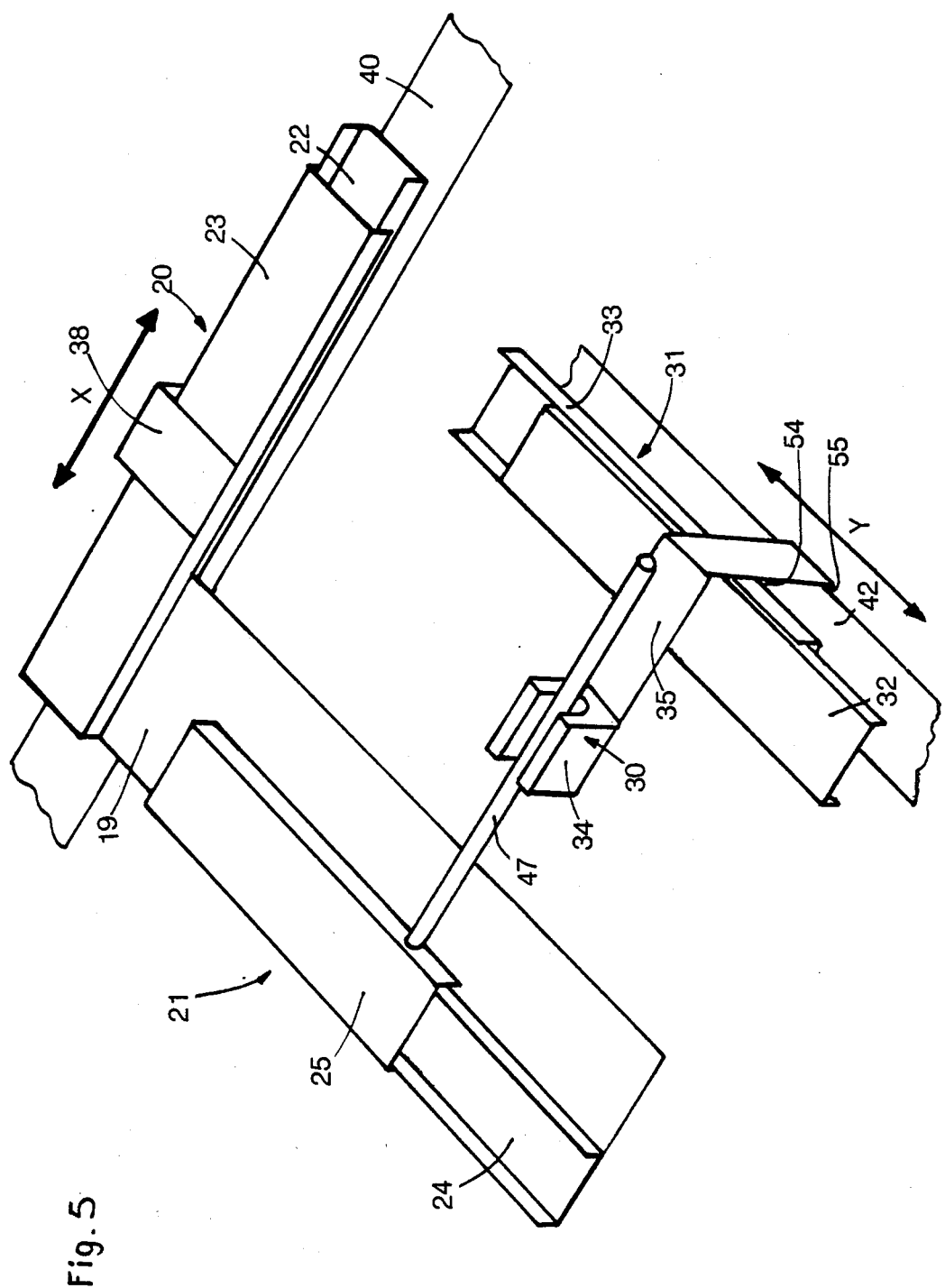
FIG. 5 is a perspective view of the slide means and of the connecting means, no other component part of the apparatus being shown (for the sake of clarity, the thicknesses of the various parts are not shown)

With particular reference to FIG. 5, the connecting means 30 consists of a U-shaped yoke 34 which is carried by the driving tab 35. A rod 47 which is parallel to the first slide 20 is placed between the arms of the U-shaped yoke 34. This rod 47 is integral with the movable part 25 of the second slide 21, which is in turn integral with the platen 7. The rod 47 can be placed under a cover (not shown) which is fixed to the movable part 25 of the second slide 21. This cover facilitates the holding of the glass plates 13, 14 of the platen 7. The connecting means 30, namely the yoke 34, can thus move in translation under the effect of the second motor 27 in a fixed direction which is parallel to the second slide 21 and parallel to the Y direction, whilst driving the rod 47 which is integral with the platen 7 and perpendicular to the second slide 21, the rod 47 and the yoke 34 moving in a translational movement relative to one another.

The placing of a specified microview of a microfiche opposite the optical system of the reader can be carried out according to the process described below. The first motor and the second motor of the reader can be controlled by a key-board device associated with a microcomputer, for example.

First, the microfiche is placed between the glass plates 13 and 14 of the platen 7. The position of each microview is identified on the microfiche by an alphanumeric code, and the user presses the code of the selected microview on the keys of a keyboard. The keyboard is, by appropriate means, associated with a microcomputer which issues instructions making it possible, by appropriate circuits, to control the first and second motors and thus cause movement of the platen 7 of the reader in the X and Y directions, the movements in these two directions being preferably simultaneous.

Through the intermediacy of the toothed wheel 28, the cog belt 40 and the driving tab 38, the first motor 26 causes the movement of the movable part 23 of the first slide 20 in the X direction. The movable part 23 of the first slide 20 being connected to the platen 7 through the intermediacy of the second slide 21 by means of the plate 19, the movement of the movable part 23 of the first slide 20 causes the movement of the second slide 21 and consequently the movement of the platen 7, in the X direction.

The second motor 27, through the intermediacy of the toothed wheel 41, the cog belt 42 and the driving tab 35, causes the movement of the movable part 33 of the third slide 31 in the Y direction. The connecting means 30, which is integral with the movable part 33 of the third slide 31, is therefore driven by the movement of the third slide 31 in the Y direction. The connecting means 30 moves in a fixed rectilinear trajectory which is parallel to the second slide 21. By its movement, the connecting means 30 drives the rod 47. Since the rod is solid with the movable part 25 of the second slide 21, this movable part 25 also moves in the Y direction. Consequently, the platen 7 which is integral with the movable part 5 of the seconed slide 21 moves in the Y direction, under the effect of the second motor 27.

Thus, in the apparatus which is the subject of the invention, the movements of the platen 7 are caused by the first motor 26 and the second motor 27 which are each fixed relative to the base 1 of the apparatus.

According to another embodiment shown in FIG. 6, the connecting means 30 can consist of a thrust bearing 48, such as for example a ball bearing, carried by the driving tab 35, the driving tab 35 being fixed by appropriate means at 55 to the belt 42 and at 54 to the movable part 33 of the third slide 31. The thrust bearing 48 is disposed in a groove 49 in the platen 7 that is parallel to the first slide 20, and bounded by two vertical faces 52, 53. The thrust bearing 48 moves in translation under the effect of the second motor 27 in a direction which is parallel to the second slide 21 and parallel to the Y direction, while resting against one or the other of the faces 52 or 53 of the groove 49 in the platen 7, which provides the movement of the platen 7 in the Y direction. As the thrust bearing, and the groove 49 move in a translation movement relative to one another, the movement of the platen 7 in the X direction is produced by means, and by a process, which are analogous to those described previously.

According to yet another embodiment of the invention, shown in FIG. 7, the connecting means 30 can consist of a bushing 50 such as a ball bushing which is carried by the driving tab 35, the driving tab 35 being fixed by appropriate means at 55 to the belt 42, and at 54 to the movable part 33 of the third slide 31. The movement for the platen 7 in the Y direction is analogous to the movement of the platen 7 with the connecting means 30 comprised of a yoke 34, the bushing 50 and the rod 47 moving in a translational movement relative to one another.

Of course, the invention is in no way limited to the embodiments specifically described herein and those having familiarity with this technology will be able to adopt variants or improvements relating to the various means employed or may combine various variants without nevertheless departing from the scope of the present invention.

The apparatus, which comprises at least a lightsource, an optical system, a base and a platen intended especially to carry microfiches, and which is the subject of the invention, offers numerous advantages. Among these advantages it may be noted that this apparatus makes it possible to bring a specific microview opposite the optical system of the apparatus without manual intervention of the operator and with accuracy. Furthermore, since the motors causing the movement of the stage are fixed, the design of the apparatus is facilitated, and in particular the electrical supply to the motors is easier.

The apparatus which is the subject of the invention is particularly advantageous to use as an apparatus in which microfiches are employed, such as a microfiche reader or a reader for the reproduction of microfiches.

What is claimed is:

1. An apparatus for positioning a microfiche relative to an optical system, comprising:
   (a) a base;
   (b) a platen adapted to support a microfiche and capable of moving in a plane relative to said base; and
   (c) means for moving said platen in said plane, said moving means including
      (1) a first slide having a first part integral with said base and a second part movable on and relative to said first part in a first direction;
      (2) a second slide having a first part integral with said second part of said first slide for movement therewith, and a second part fixed to said platen and seated upon such first part for sliding movement thereon, in spaced relationship from said base, in a second direction oriented perpendicularly to said first direction;
      (3) a third slide having a first part integral with said base and a second part movable on and relative to to such first part in said second direction;
      (4) connecting means for connecting said second part of said third slide to said second part of said second slide for simultaneous movement in said second direction, and permitting movement of said second part of said second side in said first direction relative to said second part of said third slide;
      (5) a first motor mounted fixedly relative to said base and connected to said second part of said first slide for moving said second part of said first slide, together with said first and second parts of said second slide and said platen, in said first direction; and
      (6) a second motor mounted fixedly relative to said base and connected to said second part of said third slide for moving said second part of said third slide, together with said second part of said second slide and said platen, in said second direction.

2. An apparatus according to claim 1, wherein said connecting means comprises a member mounted on one of said second part of said second slide and said second part of said third slide, said member received in a recess carried by the other of said second part of said second slide and said second part of said third slide, said recess defined by first and second surfaces which are spaced apart in said second direction such that said second part of said second slide is driven in said second direction by said second part of said third slide, said member and recess being relatively slidable in said first direction so as to freely permit said second part of said second slide to travel in said first direction.

3. Apparatus according to claim 2, wherein said member comprises a rod and said recess is defined by a U-shaped yoke which slidably receives said rod.

4. Apparatus according to claim 2, wherein said member comprises a thrust bearing carried by said second part of said third slide, and said recess is defined by a groove in said platen.

5. Apparatus according to claim 2, wherein said member comprises a rod and said recess is defined by a hollow cylindrical bushing which slidingly receives said rod.

6. A microfiche reader comprising:
   (a) a base;
   (b) a light source and an optical system mounted on said base;
   (c) a platen adapted to support a microfiche and capable of moving in a plane relative to said base; and
   (d) means for moving said platen in said plane, said moving means including
      (1) a first slide having a first part integral with said base and a second part movable on and relative to said first part in a first direction;
      (2) a second slide having a first part integral with said second part of said first slide for movement therewith and a second part fixed to said platen and seated upon such first part for sliding movement thereon, in spaced relationship from said base, in a second direction oriented perpendicularly to said first direction;
      (3) a third slide having a first part integral with said base and a second part movable on and relative to such first part in said second direction;
      (4) connecting means for connecting said second part of said third slide to said second part of said second slide for simultaneous movement in said second direction, and permitting movement of said second part of said second slide in said first direction relative to said second part of said third slide, said connecting means comprising a member mounted on one of said second part of said second slide and said second part of said third slide, said member received in a recess carried by the other of said second part of said second slide and said second part of said third slide, said recess defined by first and second surfaces which are spaced apart in said second direction such that said second part of said second slide is driven in said second direction by said second part of said third slide, said member and recess being relatively slidable in said first direction so as to freely permit said second part of said second slide to travel in said first direction,
      (5) a first drive means including a first motor mounted fixedly relative to said base, a first toothed wheel driven by said first motor, and a first endless cog belt driven by said first toothed wheel and connected to said second part of said first slide for moving said second part of said first slide, together with said first and second parts of said second slide and said platen, in said first direction; and (6) a second drive means including a second motor mounted fixedly relative to said base, a second toothed wheel driven by said second motor, and a second endless cog belt driven by said second toothed wheel and connected to said second part of said third slide for moving said second part of said third slide, together with said second part of said second slide and said platen, in said second direction.

7. An apparatus for positioning a microfiche relative to an optical system, comprising:
(a) a base;
(b) a light source and an optical system mounted on said base;
(c) a platen adapted to support a microfiche and cap of moving in a plane relative to said base;
(d) means for moving said platen in said plane, said moving means including
(1) first and second motors, each of which is mounted in a position relative to said base;
(2) a first slide having a first part integral with said base and a second part that is movable relative to said first part, said second part being driven by said first motor;
(3) a second slide having a first part that is integral with said second part of said first slide and a second part that is movable relative to said first part and that is integral with said platen, said first and second slides being arranged such that they permit the movement of said platen in two directions perpendicular to one antoher;
(4) a third slide having a first part integral with said base and a second part driven by said second motor in a direction of movement parallel with that of the second slide; and
(5) connecting means for connecting said second part of said third slide to said second part of said second slide for concurrent, simultaneous movement, said connecting means comprising a yoke that is integral with said second part of one of said second and third slides and a rod that is integral with the second part of the other of said second and third slides and that is disposed parallel to the direction of movement of said first slide, said rod being disposed in said yoke and translatable relative thereto.

8. An apparatus for positioning a microfiche relative to an optical system, comprising:
(a) a base;
(b) a light source and an optical system mounted on said base;
(c) a platen adapted to support a microfiche and capable of moving in a plane relative to said base;
(d) means for moving said platen in said plane, said moving means including
(1) first and second motors, each of which is mounted in position relative to said base;
(2) a first slide having a first part integral with said base and a second part that is movable relative to said first part, said second part being driven by said first motor;
(3) a second side having a first part that is integral with said second part of said first slide and a second part that is movable relative to said first part and that is integral with said platen, said first and second slides being arranged such that they permit the movement of said platen in two directions perpendicular to one another;
(4) a third slide having a first part integral with said base and a second part driven by said second motor in a direction of movement parallel with that of the second slide; and
(5) connecting means for connecting said second part of said third slide to said second part of said second slide for concurrent, simultaneous movement, said connecting means comprising a thrust bearing that is integral with said second part of said third slide, said thrust bearing being disposed in a groove in said platen which is parallel to the direction of movement of said first slide.

9. An apparatus for positioning a microfiche relative to an optical system, comprising:
(a) a base;
(b) a light source and an optical system mounted on said base;
(c) a platen adapted to support a microfiche and capable of moving in a plane relative to said base;
(d) means for moving said platen in said plane, said moving means including
(1) first and second motors, each of which is mounted in a fixed position relative to said base;
(2) a first slide having a first part integral with said base and a second part that is movable relative to said first part, said second part being driven by said first motor;
(3) a second slide having a first part that is integral with said second part of said first slide and a second part that is movable relative to said first part and that is integral with said platen, said first and second slides being arranged such that they permit the movement of said platen in two directions perpendicular to one another;
(4) A third slide having a first part integral with said base and a second part driven by said second motor in a direction of movement parallel with that of the second slide; and
(5) connecting means for connecting said second part of said third slide to said second part of said second slide for concurrent, simultaneous movement, said connecting means comprising a bushing that is integral with said second part of one of said second and third slides and a rod that is integral with the second part of the other of said second and third slides and that is disposed parallel to the direction of movement of said first slide, said rod being disposed in said bushing and translatable relative thereto.

* * * * *